A. B. CADMAN.
MEANS FOR TRANSPORTING LOGS OR THE LIKE.
APPLICATION FILED JAN. 28, 1918.
1,308,039.
Patented July 1, 1919.
3 SHEETS—SHEET 3.
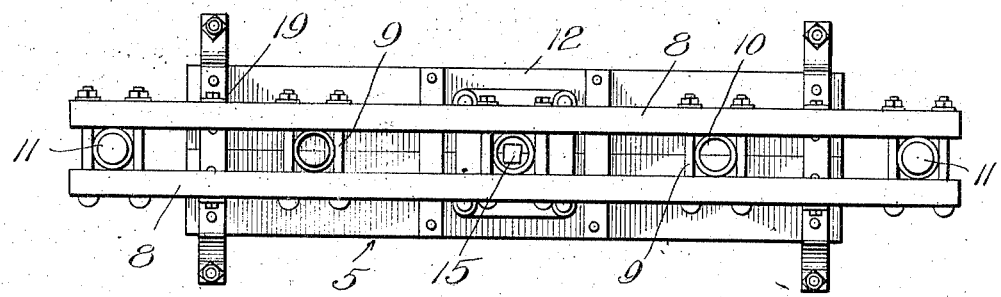
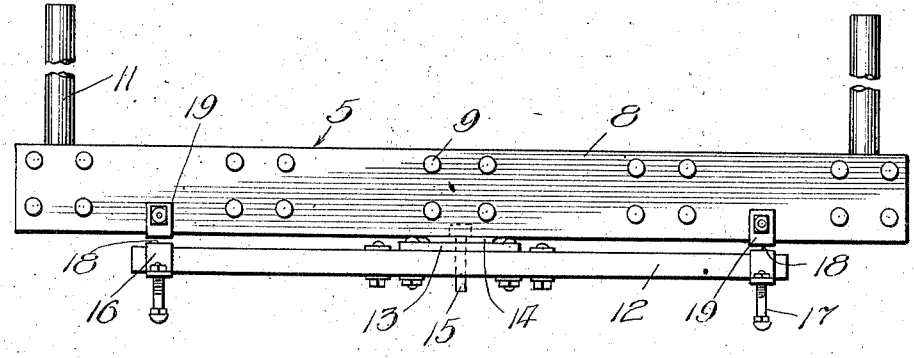
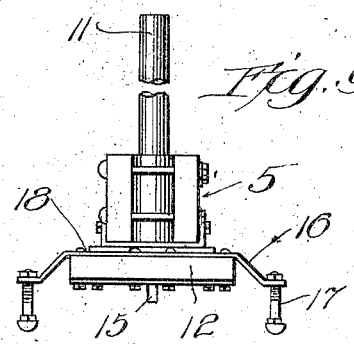
Witness
Harry S. Gaither
Inventor:
Addi Benjamin Cadman
By Miller China Parker
Attys

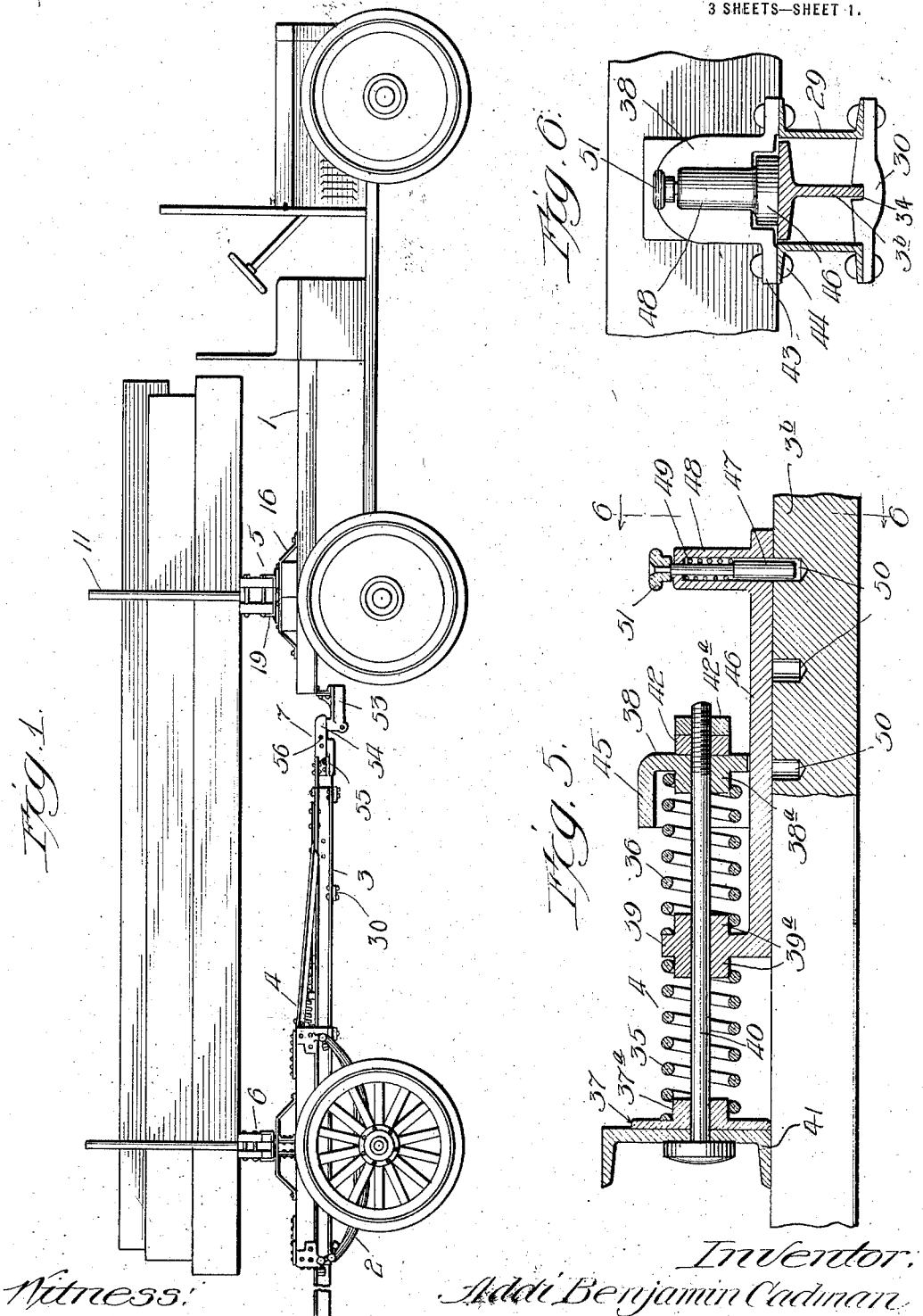

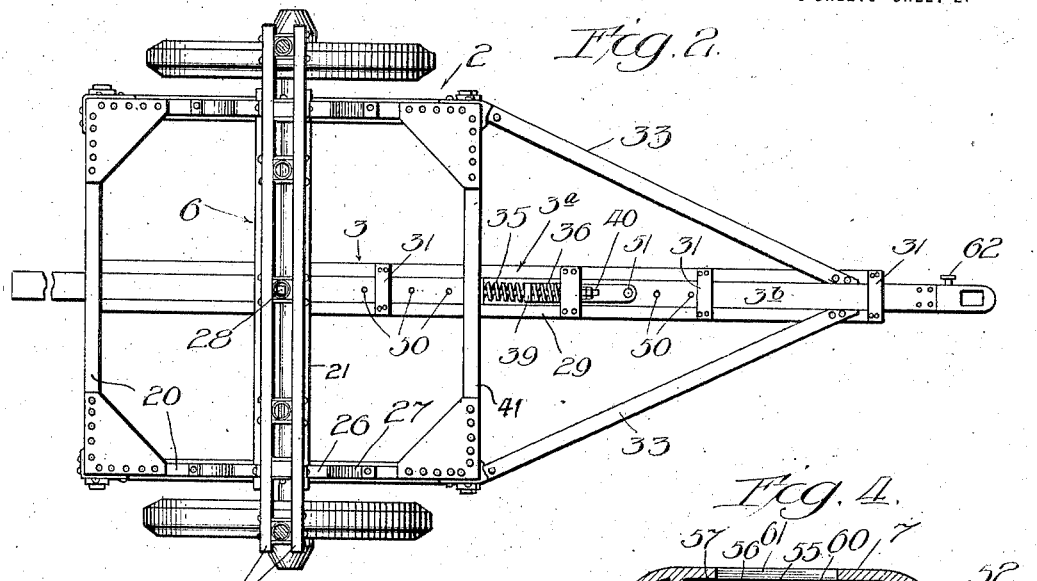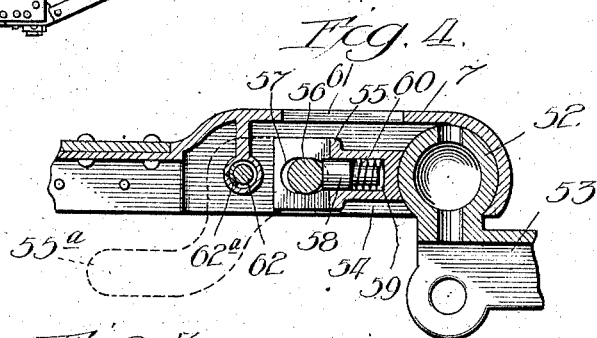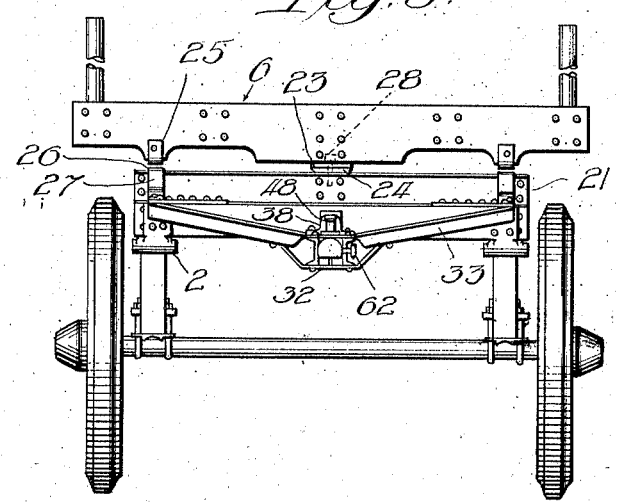

UNITED STATES PATENT OFFICE.

ADDI BENJAMIN CADMAN, OF BELOIT, WISCONSIN, ASSIGNOR TO WARNER MANUFACTURING COMPANY, OF SOUTH BELOIT, ILLINOIS, A CORPORATION OF WISCONSIN.

MEANS FOR TRANSPORTING LOGS OR THE LIKE.

1,308,039.     Specification of Letters Patent.     Patented July 1, 1919.

Application filed January 28, 1918. Serial No. 214,093.

*To all whom it may concern:*

Be it known that I, ADDI BENJAMIN CADMAN, a citizen of the United States, residing at Beloit, in the county of Rock, in the State of Wisconsin, have invented certain new and useful Improvements in Means for Transporting Logs or the like, of which the following is a specification.

The invention relates to means for transporting logs or the like, comprising a drawing unit and a trailer truck attached to the drawing unit, the load being borne partially by the drawing unit and partially by the trailer.

Transporting means of this character are sometimes employed in logging districts where they are subjected to extremely hard usage by reason of the character of the roads which are necessarily traveled, and difficulty has been experienced in transporting loads of heavy logs or timbers on account of the enormous strains upon the parts and especially the bolsters on the truck and trailer when turning corners or traveling over rough or hilly ground. The strains are due to the fact that when the apparatus is turning a corner or a bend in the road, or is traveling over rough or hilly ground, the rear wheels of the truck are out of alinement with, or are higher or lower than, the trailer wheels or the front wheels of the truck, so that the distance between the bolster on the truck and the bolster on the trailer is constantly varying, and inasmuch as the load resting on said bolsters is not expansible or compressible, such variation results in tremendous strains upon the bolsters and associated parts.

In some of the log transporting means heretofore produced, it has been attempted to eliminate the difficulty by providing a roller on one of the bolsters for the load of logs to rest on, which roller was intended to permit the logs to move with respect to the bolster so as to relieve the strain on the latter. It has been found, however, that due to the extreme weight of the logs or the roughness of their exterior such a roller is ineffective to prevent undue strain on the bolsters. Further, it is necessary to chain the logs tightly to the bolsters to hold the logs in place, and this increases the friction and tends to prevent the contemplated relative motion between the logs and the bolster carrying the roller.

It has also been proposed to eliminate or minimize the variation of distance between the bolsters on the truck and the trailer by locating the joint between the trailer tongue and the truck directly beneath the vertical axis of the bolster on the truck, so that such joint will be coincident with the bolster axis and the distance between the two bolsters would theoretically remain approximately constant. As a practical measure, however, it has been found not feasible to locate such joint directly beneath the axis of the truck bolster, and, in fact, it has been necessary to locate such joint a substantial distance behind such axis, with a result that considerable variation in distance between the bolsters occurs during travel. Furthermore, with this arrangement, if the trailer tongue projects a considerable distance beneath the motor truck bed, there is danger of breakage of the tongue or other parts by being struck by the projecting rear end of the truck bed when the truck wheels drop into a gulley or depression in the road. It is desirable, also, to have the joint between the trailer tongue and the truck a disengageable one, and with the arrangement above mentioned, the joint is located in an extremely inaccessible or awkward position beneath the truck bed.

In its broad aspect, my invention aims to overcome the difficulties above described and at the same time to permit of locating the coupling or joint between the trailer tongue and the motor truck at the rear end of the motor truck body where such coupling or joint will be freely accessible. This result is accomplished by providing a single pivoted bolster on the motor truck and also a single bolster pivoted on a central vertical axis on the trailer; by providing a detachable coupling, one element of which is mounted on the rear end of the motor truck and the other element of which is mounted on the forward end of the trailer tongue; and by providing a special construction of the trailer tongue or draw bar whereby any change in the relationship of the wheels of the motor truck and the trailer, whether this be due to turning corners or passing over rough or hilly ground, shall be compensated for and shall not cause a variation in distance between the bolsters, so that the load may be bound tightly to the bolsters and does not slip with respect to the bolsters, nor does the load produce any undue strain upon such bolsters.

Another object of the invention is to produce an improved transporting means in which the trailer tongue is made of telescoping or extensible construction so that the distance between the bolsters may be varied, and which embodies a detachable coupling, one member of which is mounted on one of the sections of the trailer tongue and the other member on the motor truck.

A further object is to provide an improved construction of the trailer tongue or draw bar which embodies a spring cushioned connection between the telescoping members of such tongue.

Another object is to provide an improved construction and arrangement for the trailer draw-bar and bolster relative to the body frame.

The objects of the invention thus generally stated, together with other and ancillary advantages, are obtained by the construction and arrangement illustrated in the accompanying drawings forming part thereof, in which Figure 1 is a side elevation of the transporting means, comprising a drawing unit and a trailer truck connected together and having a load of timber mounted thereon. Fig. 2 is a top plan view of the trailer detached. Fig. 3 is a front end view of the same. Fig. 4 is a fragmental, vertical sectional view through the coupling means in operative position. Fig. 5 is a similar view through a portion of the draw-bar, showing the sectional construction thereof and the yieldable connection between such sections. Fig. 6 is a transverse sectional view on line 6—6 of Fig. 5. Fig. 7 is a top plan view of the bolster of the drawing unit. Figs. 8 and 9 are respectively side and end views of the same.

A preferred embodiment of my invention is illustrated in the drawings, in which 1 indicates the bed or body of a motor truck which forms the drawing unit, and 2 indicates a trailer truck having a sectional draw-bar 3, which in turn has yieldable connecting means 4 between its sections. The motor truck 1 and trailer 2 are provided with load supporting bolsters 5 and 6 respectively, and coupling means 7 is provided at the rear end of the drawing unit for connecting the draw-bar to said unit.

The motor truck 1 may be of any preferred form, and its load supporting bolster 5 is pivotally mounted near the rear end of the body 1 with its axis preferably located directly over the rear axle of the truck. As shown in Figs. 7, 8 and 9 by way of example, the bolster 5 may comprise a pair of spaced parallel rails 8 connected together by means of bolts 9, and having between them a plurality of tubular members which serve to space the rails apart and form sockets 10 for receiving upright retaining posts 11.

In order that the bolster may be readily mounted upon the body of any form of drawing unit, it is provided with an elongated platform or base 12. Said base has fixed on its upper surface a bearing plate 13, and the bolster has fixed on the under side of its rails a plate 14, and said plates are pivotally connected together by means of a king pin 15, which may be entered through one of the sockets 10 which is centrally positioned. The base is also provided near each end with a transverse bracket 16, the ends of which are arranged to be secured to the body of the drawing unit, as by means of bolts 17. The upper surfaces of the central portions of each of said brackets also form a slideway 18, which is engaged by a slide-member 19 carried by the rails 8, said slide-member being in the form of a flat bar having upturned ends which are fastened to the sides of the rails.

The trailer truck 2 (Figs. 2 and 3) may comprise a frame 20 having a central cross-piece 21 of any preferred construction, upon which the load-supporting bolster 6 is pivotally mounted. Said bolster may be formed similarly to the bolster 5 on the drawing unit. Thus, spaced rails 22 are connected together, and have a central bearing plate 23 fixed on their under sides and arranged to bear upon a plate 24 fixed upon the upper side of the cross-piece 21. Near the opposite ends of the rails, and to the under sides thereof, are fixed slide members 25 adapted to operate upon slide-ways 26 formed upon brackets 27 which extend over the cross-piece 21 and are secured at their opposite ends to the sides of the frame 20. A king pin 28 entered through the plates 23 and 24 serves to pivot the bolster upon the truck frame.

The sectional draw-bar 3 (Figs. 2, 5 and 6) is made inflexible so as to be capable of imparting movement to the trailer truck rearwardly as well as forwardly. To this end it preferably comprises an outer section $3^a$ fixed with reference to the frame 20, and an inner section $3^b$ which is slidable longitudinally with reference to the frame and the section $3^a$. The outer section $3^a$ is formed by means of a pair of spaced parallel channel rails 29, (Fig. 6) connected together at their lower edges by means of a plurality of cross-pieces 30, and at their upper edges by means of a plurality of cross-pieces 31; and the section is secured to the under side of the frame 20 as by means of a bracket 32 and braces 33. The bracket 32 is secured to the underside of the frame at the front end thereof, and the braces extend from the front corners of the frame forwardly to the forward end of the rails 29, to which they are secured.

The inner section $3^b$ of the draw bar is in the form of a T-beam, and is arranged to slide between the rails 29 and their connecting cross-pieces, of the section $3^a$, the lower edge of said inner section being slidable in grooves 34 provided in the under crosspieces 30 of the outer section 3ª.

As shown in Figs. 5 and 6, the sections 3ª and 3ᵇ of the draw bar are normally held against relative longitudinal movement by the yieldable connecting means 4. Said means comprises a pair of springs 35 and 36, abutments 37 and 38 fixed with reference to the outer section 3ª, and a head 39 fixed with reference to the inner movable section 3ᵇ. The springs 35 and 36 are mounted upon a bolt 40 extending between the fixed abutments 37 and 38, the bolt being entered through a rail 41 at the forward end of the frame, with its free end passing through the abutment 38 and provided with a clamping nut 42 and a lock nut 42ª. The abutment 37 is preferably formed by the rail 41 of the frame which has a bearing plate secured to its forward face and provided with a boss 37ª on its forward face for positioning the spring 35; and the abutment 38 is in the form of an upright plate bridging the rails 29 of the outer section 3ª and having ears 43 secured to said rails as by means of rivets 44. Preferably, the forward face of the plate is provided with a boss 38ª for positioning the spring 36, and the edge of the plate is provided with a semi-annular forwardly extending flange 45, to form a socket for the spring around the boss 38ª.

The head 39 which is mounted upon the inner movable section 3ᵇ of the draw bar, is formed on the rear end of a plate 46 secured to said section, and is arranged to slide on the bolt 40 with the adjacent ends of the springs 35 and 36 abutting against its opposite sides. Preferably, bosses 39ª are also provided on each side of the head for positioning the springs.

In order that the draw bar may be extensible, means are provided for adjustably securing the plate 46 to the inner slidable section 3ᵇ. Such means comprises a plunger 47 mounted in an upright barrel 48, which may be formed integral with the forward end of the plate 46. A spring 49 operating between the upper end of the barrel and said plunger serves to normally force the plunger into locking engagement with one of a series of recesses 50 provided in the upper side of the section 3ᵇ; and the plunger is extended upwardly through the barrel and provided with a head 51 by means of which the plunger may be readily operated.

The springs 35 and 36 are of sufficient tension to normally maintain the sections of the draw bar in fixed relation without yielding to any substantial degree, but when the draw bar is subjected to any abnormal strains, the springs are arranged to yield, and thus to relieve all undue stress on the parts.

The coupling means 7 (Fig. 4) by which the draw bar is connected to the drawing unit, preferably comprises a ball 52, mounted on a bracket 53 fixed to and projecting rearwardly from the rear end of the body 1 of the drawing unit, and a socket member 54, which is fixed to the forward end of the section 3ᵇ of the draw bar. The ball 52 is held in the socket member 54 by a retainer, which is preferably in the form of a lever 55. Said lever is pivoted between its ends on a cross-pin 56 fixed in the socket member, and has a concaved forward end corresponding to the convex face of the ball. The opening 57 of the lever, which receives said cross-pin 56 is elongated or enlarged so that the lever may be moved longitudinally with reference to the socket member, and spring means are provided for normally holding the forward end of the lever in engagement with the ball 52. Such means comprises a plunger 58 operating in a socket 59 in the lever, and normally forced into engagement with the cross-pin 56 by means of a compression spring 60 bearing between the plunger and the inner end of the socket 59. The rear end of the lever 55 is curved downwardly to form a handle 55ª, and the upper wall of the socket member 54 is provided with a slot 61 directly above the forward end of the lever. Thus, when it is desired to release the ball 52 from the socket 53, the handle 55ª of the lever is swung downwardly and the forward end thereof may pass upwardly through the slot 61. In this operation the lever is forced rearwardly by the rotundity of the ball, against the action of the spring 60 in the lever. Preferably means are provided for positively locking the lever in its operative position, and such means may comprise a transversely slidable detent 62 carried by the socket member and normally impelled by a spring 62ª into engagement with the lever. The details of construction of the coupling means 7 forms no part of the present invention, and hence such means is not described in further detail. For a more detailed description of such means, reference is made to my co-pending application, Serial No. 140,080, filed January 2, 1917.

By reason of the provision of a sectional draw-bar with a yieldable connection between sections, permitting of a relative longitudinal movement of one section relative to the other, the universal coupling means for connecting the draw-bar to the drawing unit may be located at the rear end of the drawing unit, in a vertical plane a substantial distance rearwardly to the pivot for the bolster of said unit. Such positioning of the pivot for the draw-bar is very advantageous for the reason that the coupling means is thus made readily accessible, and for the further reason that it eliminates any danger that the vertical swinging movement of the draw-bar upon its universal pivot will be limited by the body of the drawing unit.

By my invention any variation occurring in the relation of the wheels is readily taken care of by the extensible and yieldable draw-bar and the two pivoted bolsters, so that the load may be positively fixed upon the bolsters, and may be transported over very hilly and uneven ground without any danger of excessively straining the parts or of the load working loose from its fastenings.

I claim as my invention:

1. A device of the character described, having, in combination, a drawing unit and a trailer truck each having a pivoted load-supporting bolster, and an inflexible and automatically extensible draw-bar connecting said drawing unit and trailer together, said draw-bar having a pivotal connection with the rear end of the drawing unit at a point rearwardly of the axis of the bolster of said unit.

2. A device of the character described, having, in combination, a drawing unit and a trailer truck each having a pivoted load-supporting bolster, and a sectional inflexible draw-bar connected to the trailer, said draw-bar having a yieldable connection between its sections and having a detachable universal connection with the rear end of the drawing unit.

3. A device of the character described, having, in combination, a drawing unit and a trailer truck, each having a pivoted load-supporting bolster, and a draw-bar having two sections relatively slidable longitudinally of each other, one of said sections being connected to the trailer and having the other of said sections being connected to the drawing unit, spring means operating between said sections for yieldably connecting them together, and means for adjustably securing said spring means to one of said sections.

4. A device of the character described, having, in combination, a drawing unit, a trailer truck having a frame, and a drawbar for connecting said drawing unit and truck together, said draw-bar comprising an inner section, an outer section fixed to said frame and having an abutment, a laterally extending head on said inner section between said abutment and said frame, and a pair of springs operating between opposite sides of said head, and said frame and abutment, respectively, for normally holding said sections of the draw-bar against relative movement.

5. A vehicle comprising, in combination, a body frame mounted upon wheels and comprising side and end members; a cross-piece mounted on the side members of said frame; a bolster pivotally mounted on the cross-piece, said cross-piece being adapted to support the bolster so as to permit it to swing free of the frame; and an extensible draw-bar adapted to be connected at its forward end to a drawing unit and comprising an element formed of spaced parallel rails rigidly secured to the underside of the frame and connected by a plurality of cross-bars secured upon their upper and lower edges, and a second element interposed between the rails of the first element so as to be guided for longitudinal movement relative to said first element.

6. A vehicle comprising, in combination, a body frame mounted upon wheels and comprising side and end members; a cross-piece mounted on the side members of said frame; a bolster pivotally mounted on the cross-piece, said cross-piece being adapted to support the bolster so as to permit it to swing free of the frame; and an extensible draw-bar adapted to be connected at its forward end to a drawing unit and comprising an element formed of spaced parallel rails rigidly secured to the under side of the frame and connected by a plurality of cross-bars secured upon their upper and lower edges, a second element interposed between the rails of the first element so as to be guided for longitudinal movement relative to said first element, and a diagonally extending brace connecting the forward end of each rail with the frame.

7. A vehicle comprising, in combination, an open rectangular body frame mounted upon a single pair of wheels, a drawbar comprising an outer section composed of two spaced rails rigidly secured to the front and rear members of said body frame and projecting forwardly from said front body frame member, and an intermediate rail slidably supported between the first mentioned rails and embraced thereby, the forward end of said intermediate rail projecting beyond the side rails and being arranged to be attached to a drawing unit, and means for connecting said intermediate rail with the other parts of the structure, comprising an abutment having a detachable and shiftable connection with said intermediate rail and arranged to move with the latter, two stationary abutments located respectively forward and rearward of the first mentioned abutment and being rigid with respect to the body frame and the side rails of the drawbar, and two springs each located between the first mentioned abutment and one of the second mentioned abutments, said springs acting to cushion the movements of the intermediate rail of the drawbar in either direction with respect to the side rails of the drawbar.

8. A vehicle comprising, in combination, a body and supporting wheels, a drawbar for drawing the vehicle comprising two spaced side rails attached to the vehicle and an intermediate rail slidably supported and guided between said side rails and projecting forwardly beyond said side rails to be attached to a drawing unit, and means providing a yieldable connection between the intermediate rail and the side rails, comprising an abutment attached to the intermediate rail to slide therewith, two abutments stationarily mounted with respect to the side rails and located forward and rearward of the first mentioned abutment, and two springs each located between the first mentioned abutment and one of the second mentioned abutments and arranged to yield to allow the intermediate rail of the drawbar to slide with respect to the side rails thereof.

9. A combination vehicle of the character described comprising a drawing unit and a trailer truck, a bolster mounted on the drawing unit to swing on a central vertical axis, another bolster mounted on the trailer truck to swing on a central vertical axis, a draw-bar attached to the trailer truck, detachable coupling means for attaching said draw-bar to the drawing unit comprising a coupling element mounted on the drawing unit and a coöperating element fixed to the forward end of the draw-bar, the vehicle comprising parts which are relatively slidable in a front-to-rear direction and having springs acting on said slidable parts and arranged to yield to allow such relative sliding movement so as to maintain constant the distance between the respective bolsters on the drawing unit and the trailer when the vehicle is traveling.

10. A combination vehicle of the character described comprising a drawing unit and a trailer truck, a bolster mounted on the drawing unit to swing on a central vertical axis, another bolster mounted on the trailer truck to swing on a central vertical axis, a drawbar attached to the trailer truck and comprising two overlapping elements, one of which is fixed to the trailer truck and the other of which is coupled to the drawing unit, said overlapping elements of the drawbar being relatively slidable in a front-to-rear direction, and springs acting on said overlapping elements and arranged to yield to allow such relative sliding movement so as to maintain constant the distance between the respective bolsters on the drawing unit and the trailer when the vehicle is traveling.

11. A combination vehicle for hauling logs or like loads comprising a drawing unit, a trailer attached thereto, two bolsters constituting the sole support for the load, said bolsters being pivotally mounted respectively on the drawing unit and the trailer, and means for avoiding any variation in distance between said bolsters comprising two elements slidable with reference to each other in a front-to-rear direction, and two opposed springs each acting at opposite ends on the two elements, said springs allowing relative sliding movement of the elements in either front or rear direction whereby the variation in the relationship of the parts of the vehicle in traveling will not affect the distance between the bolsters.

In testimony whereof, I have hereunto set my hand.

ADDI BENJAMIN CADMAN.